United States Patent [19]

Pralus

[11] Patent Number: 4,803,063

[45] Date of Patent: Feb. 7, 1989

[54] PROCESS FOR THE CYCLIC PRODUCTION OF HYDROGEN PEROXIDE

[75] Inventor: Christian Pralus, Saint-Cyr-Au-Mont-D'Or, France

[73] Assignees: Atochem, Puteaux; Oxysynthese, Paris, both of France

[21] Appl. No.: 176,194

[22] Filed: Apr. 1, 1988

[30] Foreign Application Priority Data

Apr. 16, 1987 [FR] France ............................... 87 05429

[51] Int. Cl.$^4$ ............................................. C01B 15/02
[52] U.S. Cl. .................................................... 423/588
[58] Field of Search ......................................... 423/588

[56] References Cited

U.S. PATENT DOCUMENTS 4,046,868 9/1977 Vaughan ............................. 423/588

FOREIGN PATENT DOCUMENTS 0044480 10/1981 European Pat. Off. .

Primary Examiner—Robert L. Stoll
Assistant Examiner—Wayne A. Langel
Attorney, Agent, or Firm—Browdy and Neimark

[57] ABSTRACT

A process for the cyclic production of hydrogen peroxide comprising alternating the reduction of oxidation of a quinone in a solvent medium and extracting the hydrogen peroxide. The solvent medium contains a carboxylic acid amide comprising at least one aryl group to satisfy one of the following conditions:

(a) an aryl group is attached to the nitrogen or the carbon of the carbonyl; or (b) an aryl group is attached to the nitrogen and another aryl group, which is the same or different, is attached to the nitrogen or to the carbon of the carbonyl.

8 Claims, No Drawings

PROCESS FOR THE CYCLIC PRODUCTION OF HYDROGEN PEROXIDE

FIELD OF THE INVENTION

This invention relates to an improvement in the cyclic production of hydrogen peroxide by alternating oxidation and reduction of certain organic compounds and more particularly of anthraquinones carrying one or more substituents on one at least of the lateral nuclei.

BACKGROUND OF THE INVENTION

After dissolution in an organic solvent medium certain organic compounds constitute a working solution. The working solution containing anthraquinone is reduced to the anthrahydroquinone state by catalytic hydrogenation; and the anthrahydroquinone is then oxidized to the anthraquinone hydroperoxide state. This latter, still dissolved in the solvent medium, is subjected to a treatment with water. It is thus decomposed into hydrogen peroxide which dissolves in the water, and into anthraquinone which remains in solution in the organic solvent medium and is sent to the reduction stage.

The organic solvent used in the process should be able to dissolve both the oxidized form (anthraquinone) and reduced form (anthrahydroquinone). Since solvents that can be used and dissolve the two forms satisfactorily are rare, most often a mixture of constituents is used.

The solvents used in the anthraquinone process are usually two-constituent systems in which a solvent of the hydrocarbon type dissolves the quinone and a polar type solvent dissolves the hydroquinone.

The solvent systems used should be good solvents of both the quinone and hydroquinone forms, while being barely sensitive to degradation during the hydrogenation and oxidation phases. Further, they should have a slight solubility in water and aqueous solutions of hydrogen peroxide; and their density should be such that extraction of the hydrogen peroxide can be performed by simple separation of the aqueous and organic phases. Further, these solvent systems should also have a slight volatility associated with a high distribution coefficient of the hydrogen peroxide.

German DAS 1,945,750 proposed tert-butylbenzene as a solvent for quinone, which solvent is resistant to oxidation without notable degradation at 140° C. during several hours.

French patent No. 2,244,709 presented amides of carboxylic acids of the formula

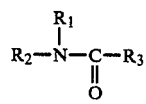

in which $R_1$, $R_2$, and $R_3$ are alkyl groups having 1 to 8 carbon atoms, as solvents of the anthraquinones used in the production of hydrogen peroxide, in particular in the form of mixtures with other solvents; but it has been found that the polar solvents are unstable because not resistant enough to oxidation.

Consequently, it appeared necessary to search for solvents exhibiting all the qualities associated with a very high resistance to oxidation and making possible the production of hydrogen peroxide with high yields.

SUMMARY OF THE INVENTION

It has now been found that a carboxylic acid amide, designated below as amide, which comprises an aryl group attached to the nitrogen or the carbon of the carbonyl exhibits an excellent resistance to oxidation, clearly superior to that of the amides cited above.

Further, it has been found that an amide comprising an aryl group attached to the nitrogen has an exceptional stability to oxidation when a second aryl group is attached to the nitrogen or the carbon of the carbonyl. Degradation can then be practically zero after hundreds of hours of oxidation.

According to the present invention, within the context of a process of cyclic production of hydrogen peroxide by alternating reduction and oxidation of a quinone, then extraction of the formed hydrogen peroxide, there is proposed a solvent medium containing a carboxylic acid amide comprising at least one aryl group to meet one of the following conditions:

(a) an aryl group is attached to the nitrogen or the carbon of the carbonyl, or (b) an aryl group is attached to the nitrogen, and another aryl group, either the same, or different, is attached to the nitrogen or to the carbon of the carbonyl.

Advantageously, the solvent medium comprises an amide with two aryl groups as defined in (b) especially if one linear alkyl group having 1 to 8 carbon atoms is attached, depending on the case, to the nitrogen or the carbon of the carbonyl.

When the aryl groups are phenyl groups or phenyls substituted by at least one alkyl group having 1 to 3 carbon atoms, the corresponding amides as, for example, N,N-diphenylacetamide, N-phenyl N-ethyl benzamide or N-phenyl N-ethyl benzamide or N-phenyl N-ethyltoluamide constitute very good polar solvents within the context of the invention, and their use is preferred.

These particular amides, according to the invention, are characterized by a very great stability to oxidation. At 150° C., these products do not degrade, although for one of the preferred polar solvents of reduced form of the oxidoreducible compounds, the most favorable, now used in the production of hydrogen peroxide, methylcyclohexyl acetate, 22% disappears in 150 hours.

The amides with the two aryls groups according to the invention can be easily associated with a hydrocarbon type solvent intervening in the dissolving of the quinone, to constitute a working solution. The solvent medium in which the anthraquinone is dissolved can advantageously consist of 5 to 50% by weight of an amide substituted according to the invention and in particular 10 to 30% by weight, the complement to 100 being made up of a hydrocarbon type solvent now used in the production of hydrogen peroxide.

The amides according to the invention constitute excellent polar solvents for making a working solution containing quinones, selected from the group consisting of anthraquinones and tetrahydroquinones, especially ethylanthraquinone (E AQ) and tetrahydroethylanthraquinone (H4 EAQ), tertbutylanthraquinone and tetrahydroterbutylanthraquinone, amylanthraquinone and tetrahydroamylanthraquinone.

Further, it has been found that for working solutions with an equivalent partition coefficient, use of the amide according to the invention improves the hydrogen peroxide productivity.

DETAILED DESCRIPTION OF THE INVENTION

Nonlimiting examples are given below illustrating the invention and bringing out these advantages.

EXAMPLE 1

In this example, a comparative study was made of the resistance to oxidation between N,N-dihexylacetamide and N-hexyl N-phenyl acetamide.

20 g of amide was placed in a glass container of 100 cm$^3$; it was heated with magnetic stirring to the desired temperature of 150° C. in the liquid phase. The unit was topped by a condenser. Air was made to bubble in the medium at a rate of 5 liters/hour.

The resistance of the N,N-dihexylacetamide to degradation was evaluated in oxidation relative to N-hexyl N-phenylacetamide after 95 hours.

For the N,N-dihexylacetamide the rate of decomposition was 34%, while for N-hexyl N-phenylacetamide the rate of decomposition reached only 9%.

The presence of an aryl group substantially reduced the degradation with oxidation, to an amount almost four times less.

EXAMPLE 2

In this example, a comparative test was made under the same oxidation conditions as above between N,N-diethylacetamide and N-ethyl N-phenylacetamide.

After an oxidation treatment of a period of 140 hours, the rate of decomposition of N,Ndiethylacetamide reached 53.5%, while that of N-phenyl- N-ethylacetamide was only 20.5%. The presence of the aromatic group protected the amide from degradation; the resistance to oxidation was increased nearly three times.

EXAMPLE 3

In this example, a parallel study was made of the resistance to oxidation of N,N-diethyltoluamide and N-phenyl N-ethyl toluamide under the same oxidation conditions at above.

After an oxidation treatment of a period of 140 hours, the rate of decomposition of N,N-diethyltoluamide was 18%, while N-phenyl N-ethyltoluamide underwent no degradation, the rate of decomposition being zero.

It was found that the presence in an amide structure of two aryl groups, one attached to the carbon of the carbonyl, the other to the nitrogen, gave the corresponding compounds an exceptional stability to oxidation.

EXAMPLE 4

In this example, a comparative study was made of the resistance to oxidation between N-phenyl N-ethyl acetamide and N,N-diphenylacetamide under the same oxidation conditions as above.

After an oxidation treatment of a period of 190 hours, the rate of decomposition of N-phenyl N-ethyl acetamide was 20.5% and for N,N-diphenylacetamide this rate was zero.

It was found that the presence of the two aromatic groups on the nitrogen of an amide structure gave these compounds an exceptional resistance to oxidation.

EXAMPLE 5

In this example a study was made of the maximum productivity of working solutions with equivalent partition coefficients containing 2-ethyl anthraquinone (EAQ).

Three solvent media were prepared containing a polar solvent such as N-phenyl N-ethylbenzamide, N-phenyl N-ethyl toluamide and methyl cyclohexyl acetate, the latter being used in the form of the mixture sold under the trademark "Sextate" ®, in mixture with a petroleum cut with a boiling point between 152-160° C., consisting of aromatic hydrocarbons of C$_9$, sold under the trademark "Antarsol" ®.

The amides disubstituted by an aromatic group and "Antarsol" ® were used in a weight ratio of 15/85. "Sextate" ® and "Antarsol" ® were used in a volume ratio of 30/70.

The maximum productivity of hydrogen peroxide of the working solution with a base of three mixtures of solvents was determined by performing a hydrogenation reaction with a working solution containing 50 g/l of ethylanthraquinone in the presence of 500 mg of palladium on an amorphous silica-alumina support at a temperature of 50° C., in a reactor of 175 cm$^3$ stirred by a swinging tray.

TABLE I

| Mixture of Solvents | Partition Coefficient | Theoretical Max Productivity H$_2$O$_2$ g/l | Max Productivity Expressed in H$_2$O$_2$ g/l |
|---|---|---|---|
| 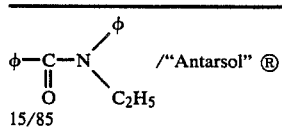 φ—C—N(φ)(C$_2$H$_5$) ‖ O  /"Antarsol" ®  15/85 | 142 | 7.2 | 7.1 precipitation |
| 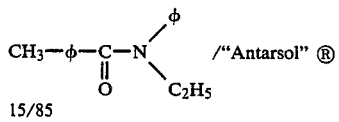 CH$_3$—φ—C—N(φ)(C$_2$H$_5$) ‖ O /"Antarsol" ® 15/85 | 150 | 7.2 | 7.2 precipitation |
| "Sextate" ® /"Antarsol" ® 30/70 | 148.5 | 7.2 | 5.8 precipitation |

φ = phenyl group C$_6$H$_5$

From reading this table it is found that for solvent media with the equivalent partition coefficients the productivities are different.

The productivity is very clearly higher with mixtures of "Antarsol" ®/amides substituted by aryl groups.

Further, precipitation began in this case only when the theoretical maximum productivity had already been practically reached.

EXAMPLE 6

In this example a study was made of the maximum productivity of the working solutions with equivalent partition coefficients containing 2-tetrahydroethylanthraquinone (H$_4$EAQ). Under the same hydrogenation conditions as above, tests were made of three mixtures of solvents consisting of "Antarsol" ® and different solvents with H$_4$EAQ used as oxidoreducible support.

TABLE II

| Mixture of Solvents | Partition Coefficient | Concentration of H$_4$EAQ | Max Productivity Obtained in H$_2$O$_2$ (g/l) |
|---|---|---|---|
| 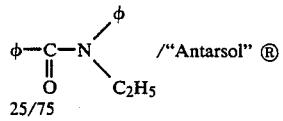 25/75 | 62.5 | 100 g/l H$_2$O$_2$ 14.2 g theoretical equivalent | 14.2 without precipitation |
| 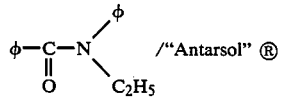 | 62.5 | Saturation 115-120 g/l equivalent H$_2$O$_2$ 16.6 g | 16-17 |
| 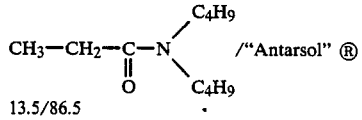 13.5/86.5 | 60.1 | 100 g/l theoretical equivalent H$_2$O$_2$ 14.2 | 14 precipitation |
| "Sextate" ® /"Antarsol" ® 50/50 | 64.3 | Saturation 93 g/l theoretical equivalent H$_2$O$_2$ 13.4 | 13-13.5 without precipitation |

φ = phenyl group C$_6$H$_5$

In the two first tests as the solvent medium there was selected a mixture consisting of a polar solvent N-phenyl N-ethyl benzamide and "Antarsol" ®, the two constituents being in a specific ratio of 25/75.

The concentration of working solution of tetrahydroethylanthraquinone is 100 g/l or a theoretical equivalent in hydrogen peroxide of 14.2 g/l, in a first test, a maximum productivity of H$_2$O$_2$ of 14.2 g/l was obtained without precipitation.

In the second test in the presence of the same solvent, but with a concentration of H$_4$ EAQ at saturation or 115-120 g/l, corresponding to a theoretical equivalent of H$_2$O$_2$ of 16.6 g, a maximum productivity of H$_2$O$_2$ of 16 to 17 g/l was obtained. Up to a productivity of at least 16 g/l no precipitation was noted, then on reaching hydrogenation saturation a slight precipitation appeared.

The third test was used in a solvent medium consisting of N,N-dibutylpropionamide, as polar solvent in mixture with "Antarsol" ® in a quantitative ratio of 13.5/86.5, the working solution contained 100 g/l of H$_4$ EAQ, or a theoretical H$_2$O$_2$ equivalent of 14.2 g. Under these conditions a maximum productivity of H$_2$O$_2$ of 14 g/l was obtained with precipitation.

The fourth comparative test was used in a solvent medium usual in the production of hydrogen peroxide with, as polar solvent, the product sold under the trademark "Sextate" ® in mixture with the product sold under the trademark "Antarsol" ® in a volume ratio of 50/50. With a working solution at saturation, containing 93 g/l, or a theoretical H$_2$O$_2$ equivalent of 13.4 g/l, a maximum productivity of H$_2$O$_2$ of 13-13.5 g/l was obtained without precipitation.

Reading of table II shows that for solvent media with equivalent partition coefficients, the best productivity is obtained by using the mixture of solvents N-phenyl N-ethyl benzamide/"Antarsol" ® (25/75).

While the invention is described above in relation to certain specific embodiments, it will be understood that many variations are possible, and that alternative materials and reagents can be used without departing from the invention. In some cases such variations and substitutions may require some experimentation, but such will only involve routine testing.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A cyclic process for production of hydrogen peroxide comprising:
   alternately reducing and oxidizing a quinone in a solvent medium; and
   extracting the hydrogen peroxide formed;
   wherein the solvent medium contains a carboxylic acid amide selected from the group consisting of carboxylic acid amides having at least one aryl group wherein an aryl group is attached to the nitrogen or the carbon of the carbonyl group; or an aryl group is attached to the nitrogen and another aryl group, which is the same or different, is attached to the nitrogen or to the carbon of the carbonyl group.

2. The process according to claim 1 wherein the amide containing two aryl groups also includes a linear alkyl group having from 1 to 8 carbon atoms attached either to the nitrogen or to the carbon of the carbonyl group.

3. The process according to claim 1 wherein the aryl groups are selected from the group consisting of phenyl groups and phenyl groups substituted by at least one alkyl group containing from 1 to 3 carbon atoms.

4. The process according to claim 1 wherein the amide is selected from the group consisting of N,N-diphenylacetamide, N-phenyl N-ethyl benzamide, and N-phenyl N-ethyltoluamide.

5. The process according to claim 1 wherein the quinone is selected from the group consisting of ethylanthraquinone, tetrahydroethylanthraquinone, tert-butylanthraquinone, tetrahydroterbutylanthraquinone amylanthraquinone and tetrahydroamylanthraquinone.

6. The process according to claim 1 wherein the solvent medium contains from 5% to 50% by weight of amide and from 50% to 95% by weight of a hydrocarbon solvent.

7. The process according to claim 6 wherein the solvent medium contains 10% to 30% by weight of amide and from 90% to 70% by weight of a hydrocarbon solvent.

8. The process according to claim 1 wherein the quinone is selected from the group consisting of anthraquinones and tetrahydroquinones.

* * * * *